United States Patent [19]

Spinosa et al.

[11] Patent Number: 4,738,413
[45] Date of Patent: Apr. 19, 1988

[54] HARNESS RESTRAINT SYSTEM

[75] Inventors: Dominic J. Spinosa, Wantagh; Frank Knoll, Huntington Station, both of N.Y.

[73] Assignee: East/West Industries, Hauppauge, N.Y.

[21] Appl. No.: 736,796

[22] Filed: May 22, 1985

[51] Int. Cl.⁴ .............................................. B64D 25/06
[52] U.S. Cl. ................. 244/151 R; 280/801; 297/467; 297/483
[58] Field of Search ............. 280/801, 804, 808; 297/465, 467, 482, 486, 483; 24/637; 244/151 R, 151 A

[56] References Cited

U.S. PATENT DOCUMENTS

| | | | |
|---|---|---|---|
| 3,424,134 | 1/1969 | Rosenblum | 244/151 R |
| 3,521,333 | 7/1970 | Dunster | 24/637 |
| 3,692,262 | 9/1972 | Gaylord | 244/151 A |
| 4,231,616 | 11/1980 | Painter | 280/808 |
| 4,488,691 | 12/1984 | Lorch | 280/801 |

FOREIGN PATENT DOCUMENTS 738989 10/1955 United Kingdom .
915168 1/1963 United Kingdom .

Primary Examiner—Richard A. Bertsch
Attorney, Agent, or Firm—Hoffmann & Baron

[57] ABSTRACT

An improved harness restraint system for a vehicle seat occupant which includes a unique single-point release device having laterally spaced connectors for attachment of shoulder harness straps. The system also includes an improved harness belt system employing a cross-chest belt configuration as well as a gross adjustment feature for pre-adjusting the harness assembly straps to substantially approximate the occupant. The new system also provides diverging lower restraint belts which encircle each leg of the occupant for antigravity and crash restraint. The single-point release device also includes an automatic release mechanism which is activated in a water environment.

42 Claims, 6 Drawing Sheets

HARNESS RESTRAINT SYSTEM

BACKGROUND OF THE INVENTION

The present invention relates to the art of harness restraint systems, and, in particular, to an improved system which provides safety and comfort to seat occupants, especially those in high performance aircraft.

In the art of vehicle passenger restraint, continual efforts are made to provide harness restraint systems which are safe in all conditions and convenient so that the vehicle occupant will find use thereof unobtrusive and thus be encouraged to use the restraint system. The value of such a system in privately owned vehicles has become increasingly important because of recently enacted mandatory seat belt laws, and the value of such systems in high performance vehicles, such as aircraft, has been realized for years.

One type of system which has been found particularly convenient includes a single-point release mechanism to which all harness latch plates terminating the belts of the restraint system can be connected at a point at the center of the body below the rib cage. See, for example, U.K. patent specification No. 915,168 of Harley Patents (International) Limited, which discloses a single point release mechanism.

Clearly, a single-point release system of this type has advantages over parallel strap multi-connection systems, such as accessibility to either hand of the occupant and ease of operation. In the case of high performance vehicles, such as aircraft, a single-point release as described above has the obvious advantage of facilitating egress from the aircraft, or in releasing the parachute harness, since the occupant must be able to separate instantly under emergency conditions as in the case of fire or ocean ditching. Furthermore, the occupant must be able to detach from the harness in a loaded condition which can result from being suspended, e.g., from a tree, or in an inverted position.

High performance aircraft undergoing violent air combat maneuvers often subject aircrewmen to acceleration loads which displace them so far out of position that control of the aircraft becomes impossible. A restraint harness is being designed to reduce vertical "z" and lateral "y" displacement in ejection seats and parachute harnesses for which the single-point release system can readily be adapted.

Regardless of the advantages of a single-point release system, certain problems remain which must be overcome to optimize safety and convenience. For example, harness systems employing single-point release have been found to have reduced lateral control for high G-load turns, spins and other maneuvers, because, among other things, the location of the shoulder straps causes them to drop off the shoulder in the loosened condition, effectively rendering the occupant's upper body unharnessed. Furthermore, the shoulder strap location is annoying to the female body form because of the constant pressure on or around the breasts. These problems are not solved by designing the single-point release system for positioning over the chest because of the increased injury potential under crash conditions. In order to minimize injury from the harness system, the single-point latching device is ideally positioned over the abdomen.

Other problems encountered in single-point release systems are associated with securing the occupant down against the seat, such as by anti-gravity straps and/or lower harness support straps. Normally a single point release device requires a strap configuration in which the strap be fixed and extended between the legs of the occupant, which can result in obvious discomfort in certain occupant-displacement situations.

It is, therefore, an object of the present invention to provide an improved single-point release harness system which overcomes the problems set forth above and other problems associated with such systems, while affording the occupant optimum comfort and convenience.

SUMMARY OF THE INVENTION

The present invention is directed to an improved harness restraint system for a seat occupant in a vehicle which includes a single-point release device having at least two releasable connectors laterally separated, but which can be actuated from a single point to release harness strap plates connected to the connectors. The present system also can include harness shoulder straps which cross diagonally over the chest of the occupant while in use and terminate in harness strap plates for attachment to the laterally separated releasable connectors. The restraint system of the present invention can also include two additional laterally spaced releasable connectors on the bottom of the single-point release device for attachment of lower body straps thereto. The restraint system can in one embodiment also include harness leg straps, each of which encircles a leg of the occupant and terminates attachment to the two additional laterally-spaced releasable connectors.

The harness straps of the present invention can include gross adjustment devices for pre-adjustment of the harness belt to approximate occupant's size, and be adjustable for all sizes when connected. This unique feature of the present invention is a harness strap device adaptable for harness assemblies requiring strap adjustment, and can include a harness belt adjustment means having an indicator viewing window which is adapted for fixed attachment to a harness assembly, and an indicator harness strap marked with indicators corresponding to adjustment lengths that accommodate different body sizes for the particular harness assembly. The indicator harness strap fits cooperatively with the adjustment means so that the indicators appear in the viewing window when the strap is the appropriate length to accommodate the indicated body size. The harness belt adjustment means can include a sliding hasp having a fixed end for securing to a fixed length of strap of a harness assembly and an adjustment end which includes the viewing window and is adapted for sliding receipt of the indicator harness strap. Finally, a harness restraint adjustor can be threaded on the indicator harness strap for minor harness adjustments after the occupant has been strapped in the harness system.

In one embodiment the harness strap system can include two lap restraint straps secured at the lower part of the occupant's body, each of which terminates in a harness strap plate for attachment to two additional laterally-spaced releasable connectors on the single point release device. Anti-gravity or harness support straps can be a single strap extending to the single point release device, or can preferably be two diverging straps that encircle each leg of the occupant.

In order to maintain symmetry, it is preferable that the at least two connectors of the device are located not less than about two inches, and preferably about 3½ inches from the center of the single point release device, with the release handle being located directly in the center of the device.

Finally, the system can also include a water-actuated emergency release mechanism for releasing the harness strap plates when submerged in a water environment.

Preferably, the entire single-point release device is positioned at the center of the occupant's body below the rib cage.

The single-point release device is an invention which is useful for releasable connection of restraint strap plates of a harness restraint system having latching holes therethrough, and can include a housing having a front and a rear wall as well as a top and a bottom side. The top and bottom sides can be provided with at least two apertures laterally spaced apart for receiving the harness strap plates. In this device a release handle can be attached for actuation to the housing, and is preferably centered on the device. Connection of the restraint strap plates can be effected by inclusion of connection pins mounted for movement between an extended position and a retracted position in the housing, adjacent each of the apertures and accessible therethrough. These connection pins are continuously urged in the extended direction for engagement with the latch holes in the strap plates, and a means for actuation links the connection pins to the release handle for retraction of the pins upon actuation of the handle, whereby the harness restraint strap plates can be disengaged. In the preferred embodiment, the restraint strap plates can be simultaneously released upon actuation of the handle.

Preferably, the single-point release device has an elongated housing with four apertures containing four connection pins, two of the apertures located at the top side of the housing and a distance of not less than about 2 inches, and preferably about 3½ inches from the center of the device, while the other two apertures are located in the bottom side directly opposite the top side apertures so that the top and bottom connection pins are mounted in a side-by-side relationship. The release handle of the present invention can be a knob secured for rotation to the housing, such as by an axle or pin extending through the housing, which is connected to the actuation means for retraction of the connection pins upon rotation either clockwise or counterclockwise. In order to preclude unwanted release of the harness strap latch plates, the knob can have a releasable locking means for locking the knob against rotation which can be selectively released to allow rotation in either direction. Preferably, this releasable locking means can be a depressible button attached to the knob for engagement with the housing in the non-depressed condition to prevent rotation, which is disengaged from the housing to allow knob rotation when the button is depressed.

Connection pins in the present invention can include a base fixed on the rear wall, a latching bolt having a beveled end surface which is coaxially mounted for longitudinal movement on the base means and secured against circumferential rotation relative to the base with the lower edge of the beveled surface oriented towards the adjacent aperture so that a restraint strap plate passed through the aperture will bear against the beveled surface and cam the latching bolt longitudinally toward the base. The latching bolt can further include a retracting element fixed thereon which cooperates with the actuation means to retract the latching bolt longitudinally toward the base. The retracting element can be a surface for receipt of a retracting cam surface thereagainst which cams the latching bolt toward the base upon actuation of the release handle. In one embodiment, the surface on the latching bolt can be provided by a pin extending substantially perpendicularly to the longitudinal axis of the latching bolt.

Finally, the connection pin also includes a biasing means, such as a compression spring surrounding the base between the rear wall and the latching bolt, which continuously urges the latching bolt toward the front wall so that the latching bolt returns to the extended condition in the absence of camming or retraction forces. In this way, the connection pin can be retracted or depressed by plunging a latching plate through the aperture and against the beveled surface and will lock the plate therein by return of the latching bolt to the fully extended position through the hole in the latch plate. Release of the plate can be effected by actuation of the release handle which, in turn, retracts the latching bolt from the extended position to allow removal of the plate from the aperture.

The actuation means of the present invention can be a crank arm fixed to the knob for rotation simultaneously therewith in either direction, an actuator coupling having a first and a second end and extending from the crank arm toward one of the connection pins. The first end of the coupling can be attached to the crank arm for moving the coupling away from the connection pin upon rotation of the crank arm in either direction. The second end of the coupling can be equipped with a retracting means for retracting the connection pin which is supported on the housing for retracting the connection pin upon rotation of the knob.

Preferably, the retracting means can be a linkage having a first end connected to the coupling and a second end formed with a retracting cam surface which coacts with a receiving surface on the connection pin to retract the pin upon movement of a linkage away from the connection pin. The linkage can be bolted to the housing through a longitudinal slot for accommodating longitudinal movement between a connect position which corresponds to the non-actuated condition of the actuation means and the disconnect position which corresponds to the actuated condition of the actuation means.

A retracting cam surface can easily be provided by a wedge-shaped finger which is braced on one side by a housing-mounted shim, the widest portion of the wedge extending beyond the receiving surface of the connection pin in the connect position and being drawn toward the receiving surface as the linkage is drawn longitudinally away from the pin upon rotation of the knob whereby the retracting cam surface bears against the receiving surface to retract the pin. In a preferred embodiment, the first end of the linkage can be offset from the second end so that parallel planes of actuation can be accommodated. The linkage can be spring loaded toward the non-actuated condition to ensure that there are no inadvertent retractions of the connection pin. Also, there can be more than one finger so that more than one connection pin can be accommodated.

An alternative embodiment of the present invention includes an emergency actuation means mounted in the housing which includes emergency actuation assembly including a source of emergency actuation force which links the connection pins to the emergency actuation force for retraction of the pins upon actuation of the emergency force. Also the emergency actuation means includes an emergency sensor securing the emergency actuation assembly against actuation in the absence of an emergency condition such as a water environment. One mode of the invention contemplates the use of a ballistic charge unit as an emergency sensor which can include a means for electrically detecting a water environment and detonating a charge in response to the water environment. In order to provide emergency actuation the emergency actuation force can continuously urge the emergency actuation assembly in the direction of retraction of the connection pin such that when the assembly is detachably fixed to the ballistic charge unit for detachment upon detonation of the ballistic charge, the emergency force is actuated in a water environment. The emergency actuation force can be provided, for example, by a tension spring fixed between the assembly and the housing.

The emergency actuation assembly, in turn, can include an emergency crank arm fixed for rotation in one direction, and at least two emergency actuator couplings, each having a first and a second end and extending from the emergency crank arm to one of the connection pins. The first end of each emergency coupling can be coupled to the crank arm for moving the coupling away from one of the connection pins upon the unidirectional rotation of the crank arm, while the second end of the coupling can be equipped with emergency means for retracting the connection pin upon movement of the coupling away from the connection pin. The emergency means for retraction can be similar to the primary means for retraction and, in a preferred embodiment the two can be one in the same, just so long as the second end of the coupling is provided with a means for allowing movement of the second end in the absence of rotation of the knob. This latter feature can be a linear slot attaching the first end of the coupling to the crank arm whereby movement of the coupling away from its respective connection pin is accommodated independent of rotation of the knob.

As a result of the present invention, an occupant in a vehicle, especially a high performance vehicle such as an aircraft, is provided with adequate restraint during extreme maneuvers, while retaining an easy, safe, single-point release mechanism, which is desirable for release in normal operation and considered mandatory during ejection and survival situations. Furthermore, the present invention provides a single point release for harnesses without compromising the function thereof in order to bring the harness latch plates to a focus at the center of the body below the rib cage.

The design of the present invention precludes the possibility of the harness dropping off the shoulder thus providing more lateral stability and less objectionable strap placement to the female form.

Other advantages attained by the present invention include a reliable emergency release system which operates independently of the manual release system and, in a preferred embodiment, provides redundancy to preclude premature or unwanted release.

Further, as a result of the ability to separate the function of the single-point mechanism as in the present invention, a manual release is provided in which the operation force does not relate in any way to the maximum load capabilities of the latching device, without incurring the weight or cumbersome construction potentially required by known single release mechanisms.

Overall, the present system provides a simple, lightweight single release mechanism with separate operation and release functions to achieve a more reliable human-engineered harness system.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

Preferred embodiments of the invention have been chosen for purposes of illustration and description and are shown in the accompanying drawings wherein.

DETAILED DESCRIPTION OF THE DRAWINGS

Figure 1:
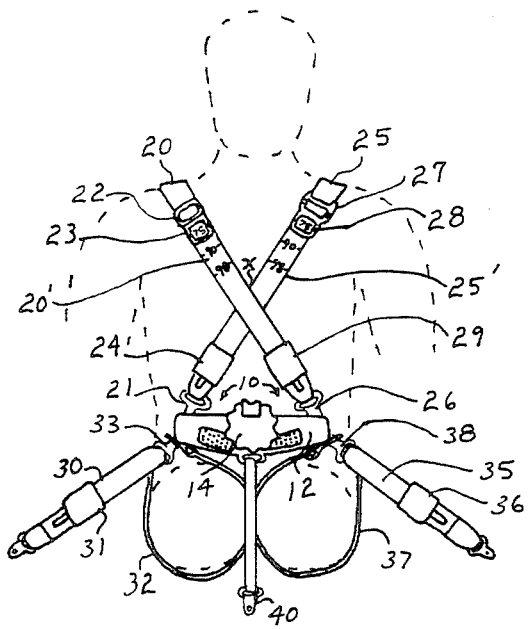
FIG. 1 is a schematic of the harness system of the present invention with a single anti-gravity crotch strap along with support halters.
Figure 1A:
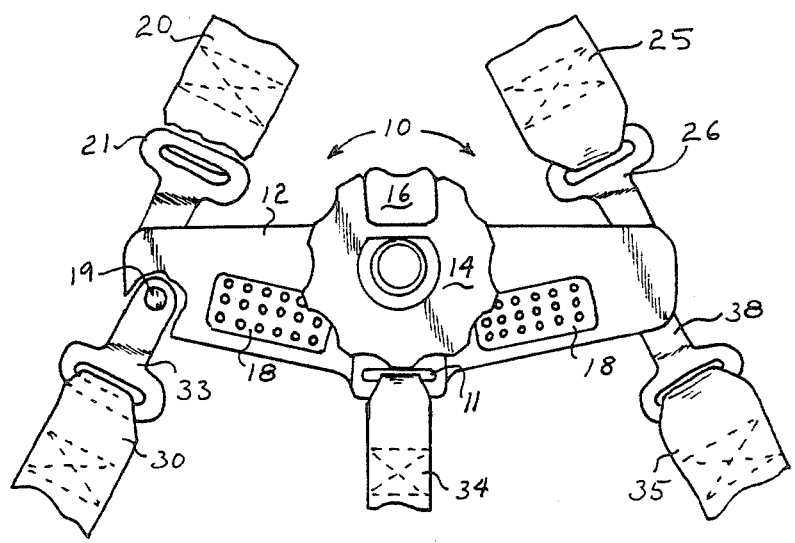
FIG. 1a is an enlarged portion of the single-point release device shown in FIG. 1.

Referring to FIG. 1 and FIG. 1a there can be seen the harness restraint system of the present invention which includes a single-point release mechanism 10 located in the center of the body and immediately below the rib cage. As shown herein, the occupant is restrained in the upper body by shoulder restraint straps 20 and 25, which can be secured to a vehicle, or, in the case of a high performance aircraft, to an ejection seat.

The shoulder harness straps extend diagonally across the occupant's body and are terminated in latch plates 21 and 26 so that the straps cross approximately in the middle of the wearer's chest, at point "x". Also included in the upper shoulder straps as shown in FIG. 1 is the gross adjustment feature of the present invention including a sliding hasp 22, 27, which are secured at their upper ends to the shoulder harness straps 20 and 25. Shoulder harness straps 20 and 25 can be secured to an ejection seat in a high performance aircraft, which can also include a powered retractable harness mechanism. The lower end of each of the sliding hasps as shown in FIG. 1 are configured with a viewing window 23, 28 through which the indicator portion of the harness belt is received and can be adjusted in accordance with the percentile corresponding to the occupant's body size.

In operation, the lower part of the shoulder harness belts 20' and 25' are adjusted to the appropriate percentile indicator corresponding to the occupant's body size and weight before entering the harness system so that upon latching the latch plates 21 and 26 into the respective connection pins in the single-point release mechanism, the harness system substantially approximates the occupant's size. The occupant can then make minor adjustments by use of retractor adjustment assemblies 24 and 29.

Figure 3A:
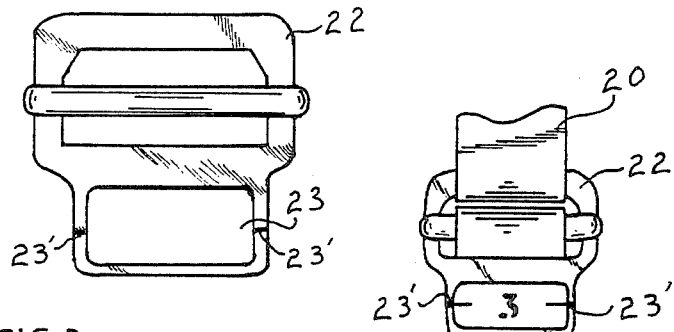
FIG. 3a depicts the hasp which can be used in the adjustment feature shown in FIG. 3.
Figure 3:
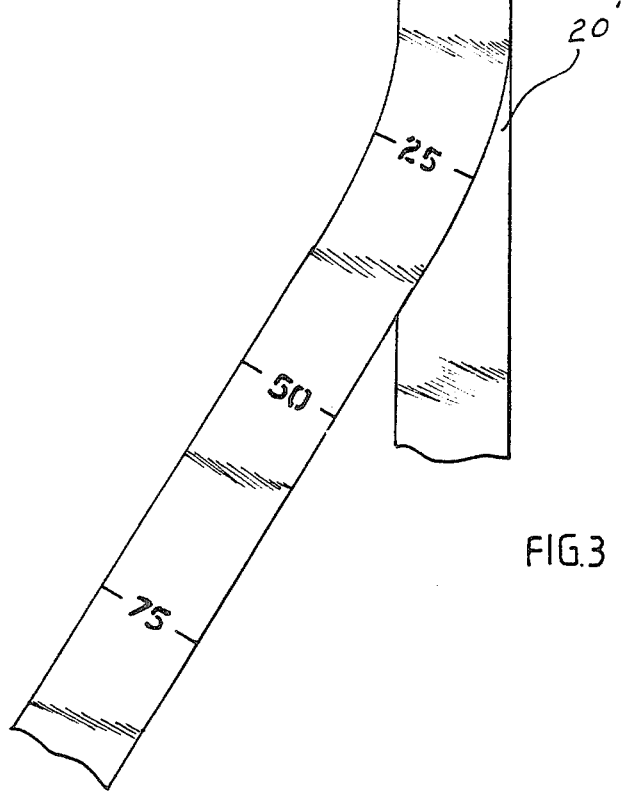
FIG. 3 is an enlarged portion of the gross adjustment feature of the present invention.

In FIGS. 3 and 3a, the gross adjustment feature is shown in an enlargement wherein the indicator harness belt 20' is slidably engaged in hasp 22 so that the indicator marks, which have been placed thereon according to the restraint system involved, can be viewed through the window 23, and aligned with indicator marks 23'.

In the embodiment shown in FIGS. 1 and 1a the harness assembly also includes lower body restraint belts 30 and 35 which can also include restraint adjustor assemblies 31 and 36. An anti-gravity strap 40 is shown as extending between the legs of the occupant, and sling support straps 32 and 37 are shown around the wearer's legs so that the lower portion of the wearer's body is supported at the end of a parachute harness. These lower body restraint straps are terminated in latch plates 33 and 38 which can be connected to the single-point release device 10, while the anti-gravity strap 40 can be permanently connected to the device through elongated slot 11 in the release mechanism.

Figure 2:
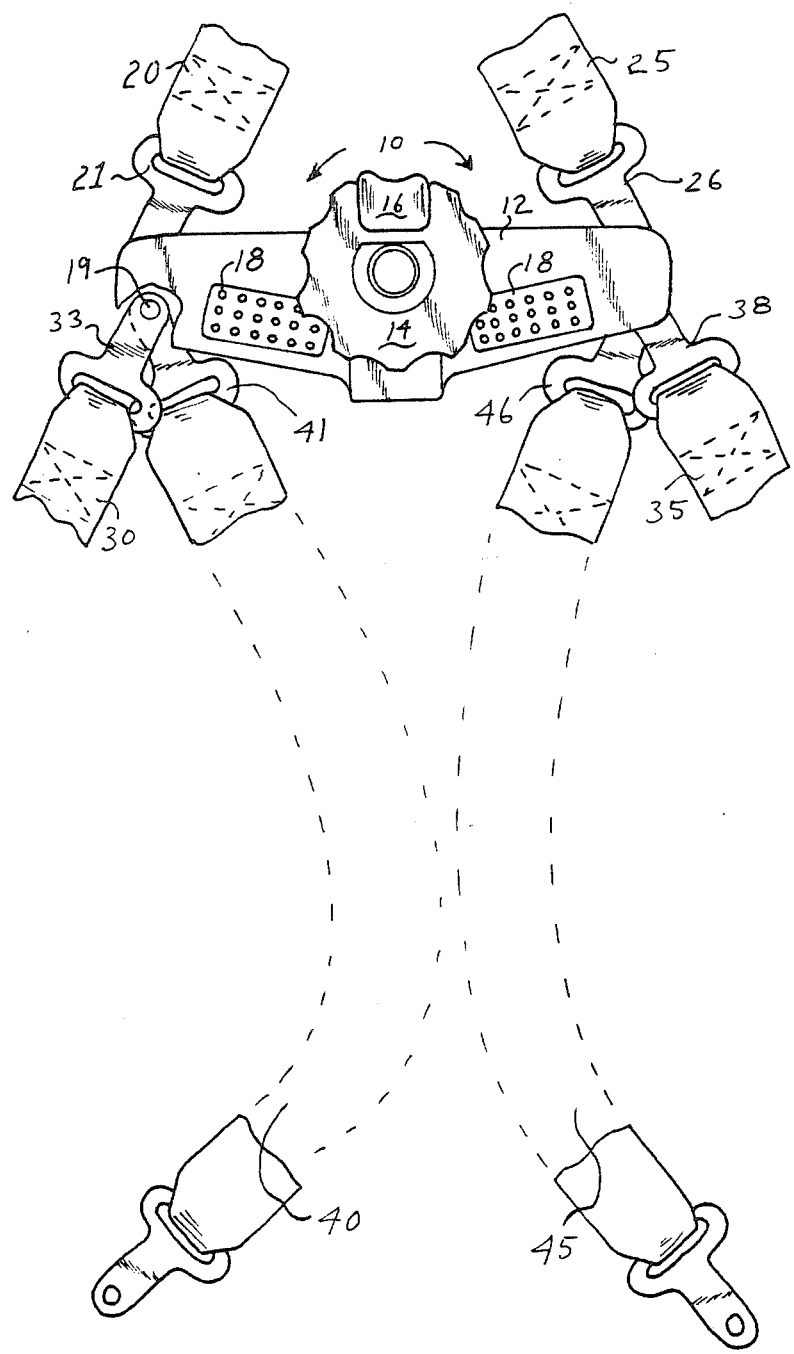
FIG. 2 is an enlarged partial schematic of the system of the present invention showing the alternative use of diverging crotch harness straps.

Referring to FIG. 2, an alternative embodiment of the present invention is shown in which all of the elements shown in FIGS. 1 and 1a have been indicated with the same numerals, and alternative lower body anti-G/harness straps 40 and 45 are shown in phantom. These restraint straps are terminated in latching plates 41 and 46 which, in turn, can be connected to the single-point release device 10. In this embodiment, the anti-gravity strap 34 has been eliminated, and the function has been replaced by the diverging leg straps 40 and 45.

Referring now to the single-point release device depicted in FIGS. 1a and 2, there can be seen an elongated device having a housing 12 on which is mounted for rotation a knob 14, which, can be turned upon depression of the release button 16. As a result of this configuration, the advantages of a single-point release mechanism are achieved for laterally separated connection points thereby providing a means for effecting the cross-chest strap configuration. The distance between the two upper connection points in which latch plates 21 and 26 are inserted can be at least 4 inches, but is preferably about 7½ inches, the release knob 14 being centered in the middle of the device. Similarly, the lower connection points are preferably located directly opposite the upper connection points for convenience of operation and construction.

The single-point release mechanisms also include fluid screens 18 which permit penetration of fluids such as water through the housing 12. As a result of this feature of the invention, a water environment, which can result from the aircraft and/or ejection seat ditching in a body of water, can be detected by emergency release mechanisms designed for operation upon contact with a water environment, without inadvertent actuation such as by raindrops, etc. Moreover, there can be provided two such actuation devices so that actuation of one device will not trigger the release mechanism. This redundancy in emergency mechanisms ensures unwanted premature emergency actuation.

This type of mechanism allows an occupant such as a pilot to release himself from the flight harness when required. When emergency conditions do occur, such as an aircraft fire or sea ditching, the pilot needs to get out as quickly as possible. If there is an in-flight ejection, the violent motions incurred during escape, including flailing of the arms and legs, must not accidently cause release. This factor necessitates the safety latch with a rotary motion. A pull or push mechanism could accidently be released, but accidental imparting the rotary motion to the present device is highly unlikely in the absence of a conscious effort to release the mechanism. The single-point release of the present invention does not relate in any way to loads on the harness system itself. Release is accomplished by disconnecting actuation of connection pins, such as 19 (shown in cutaway of FIGS. 1a and 2), by wedging the connection pins out of the latch plate holes. The force required is easily provided by a pilot, who can release at any time by pressing the release button 16 and rotating the central knob 14 in either direction using either hand. In a preferred embodiment the rotation pulls all four connection pins down simultaneously. The device can be provided with springs which then eject the latch plates in an outward direction and the harness is thereby released.

Automatic actuation can be accomplished by a pyrotechnic device which is detonated by sensing a water environment. These devices are well known safety features in high performance aircraft technology. Immersion in water will cause them to fire, actuating a releasing mechanism to retract latch pins and jam the release mechanisms in the open position. If the latch plates are spring-loaded they will then be kicked free by the spring when the entire redundant system is fired. It is important for purposes of use and manufacture that the weight and size of the single-point release device be kept to a minimum, while it is also necessary to provide cross-over strap configuration, thus preferably placing the shoulder strap latch plates about 7½ inches apart. As a result of the present invention, a single-point release mechanism can be constructed of light weight material, such as plastic for non-loadbearing parts, which is 9 inches wide by about 3¾ inches wide and has a thickness of under about ¾ inch.

Figure 4A:
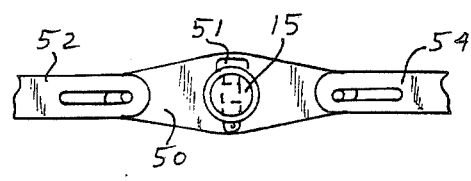
FIGS. 4, and 4a–c, depict the single-point release mechanism of the present invention.
Figure 4B:
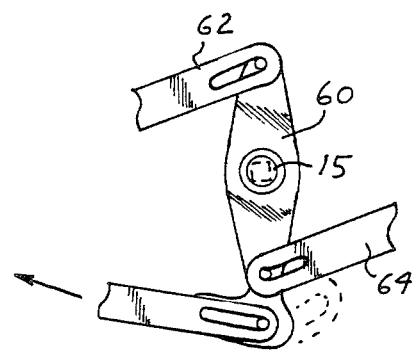
Figure 4C:
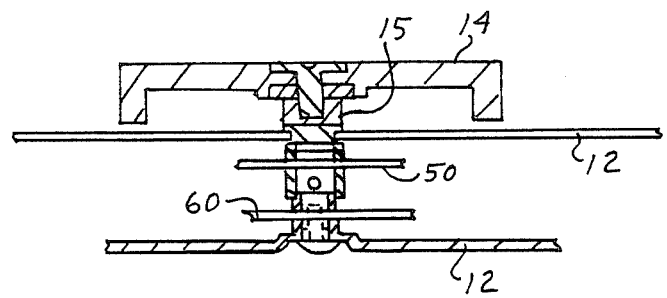
Figure 4:
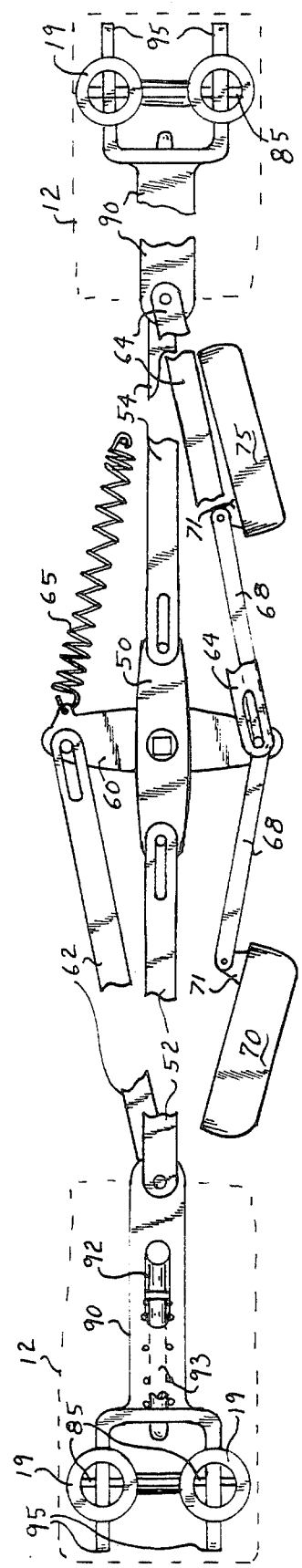

In order to understand the mechanism by which the invention achieves the separated-function single-point release, reference is made to FIGS. 4, 4a–c, and FIGS. 5 and 6. FIG. 4 shows the overall single-point release mechanism without the full extensions of linking bars or rods. FIGS. 4a–c show different components of the mechanism shown in FIG. 4. Specifically, FIGS. 4 and 4a show a crank arm 50 which is pinned by axle pin 51 to the axle 15 of knob 14. See FIG. 4a. Thus when knob 14 is rotated in either direction, crank arm 50 is made to rotate to the same extent. Crank arm 50, in turn, is connected at either end to couplings 52 and 54 which extend between the ends of crank arm 50 and the laterally-separated connection pins mounted in the housing at either end of the couplings 52 and 54. Thus, when crank arm 50 is made to rotate in a clockwise or a counter-clockwise direction, the couplings 52 and 54 are both moved away from the connection pins located at the far ends thereof. The effect of this move away from the connection pins will be discussed in detail below.

Figure 6:
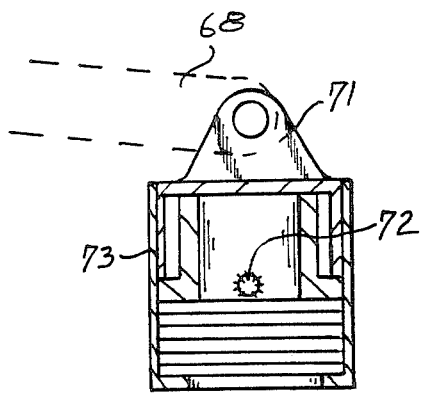
FIG. 6 shows an elevated cross-section of an emergency-release mechanism.

An emergency release mechanism is also shown in FIGS. 4, 4b, and 6, which includes an emergency crank arm 60 connected at either end to emergency couplings 62 and 64 which, in turn, extend toward the laterally-spaced connection pins. The emergency crank arm 60, which is mounted for free rotation to the knob axle 15 is attached to a tension spring 65 at one end thereof for continual biasing in the direction of the spring. The opposite end of the crank arm 60 is fixed to a tie bar 68 which extends between two emergency actuator devices 70 and 75. The emergency actuator devices 70 and 75 should be mounted in the housing directly behind screens 18 so that they can be immersed in a water environment upon passage of water through the screen. FIG. 6 shows a detailed assembly of an example of a ballistic device which can be connected to the tie bar 68 via press fit head 71. When the apparatus senses a water environment and detonates, the explosion causes projectile 72 to strike the press fit head 71 which detaches from the shell 73 thereby releasing tie bar 68. Redundancy in this emergency apparatus is preferred in order to preclude inadvertent detonation of the device.

Thus, in operation, water submersion will cause a capacitance change in the electronic device, which generates a spark and detonates the miniature ballistic cartridge, driving the projectile 72 into the hole of pressed fit head 71 dislodging it and permanently moving the tie bar 68 a fixed distance to near release. An identical chain of events accomplishes the same results on the other side. Once the tie bar 68 is released from the emergency release devices 70 and 75, the tension spring pulls the emergency crank handle 60 and, thus, the emergency couplings 62 and 64 away from the connection pins located at the opposite ends of the emergency couplings, thereby effecting disconnect of the connection pins from the latch plates. This disconnection will also be explained hereinbelow.

Figure 5:
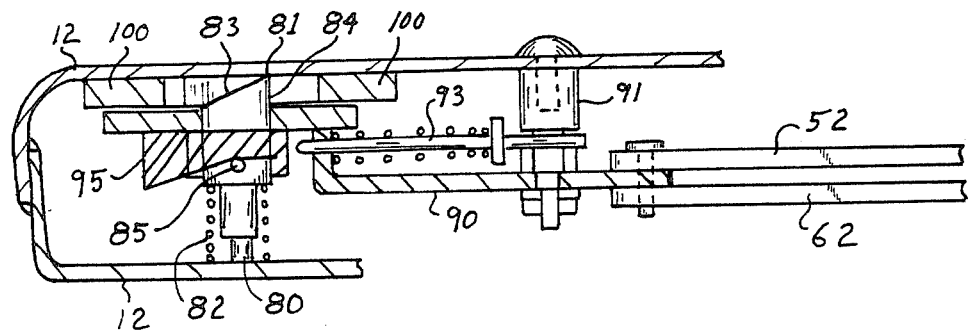
FIG. 5 is a side elevation of one of the connection pin(s) combined with the release mechanism mounted in the housing.

In order to explain the operation of the disconnect feature of the present invention, reference is made to FIGS. 4 and 5 which show the relationship of the single-point release mechanism with the laterally spaced connection pins 19 as well as the pin retracting mechanism.

Referring to the connection pin 19, there is shown a pin base 80 on which a sliding latch bolt 81 is mounted for longitudinal movement, the latch bolt 81 being biased toward the extended position by compression spring 82. In order to ensure consistent performance, the compression spring 82 can be redundant. The latching bolt 81 is beveled at the operative end so that the lower part of the beveled surface 83 is oriented toward the aperture. In this way, the latching plate will strike the beveled surface 83 of the latching bolt and cam it downward against the action of compression spring 82 until the hole of the latching plate comes directly over the latching bolt at which point the latching bolt 81 returns under force of compression spring 82 to the extended position thereby engaging the latching plate with the shoulder 84. There is also located a perpendicularly oriented pin 85 affixed to the latching bolt 81 for receiving a camming surface of an actuation element.

In order to retract the latching pin away from the extended position and thereby permit removal of the latch plates, a retraction link 90 is provided which can in one embodiment be bifurcated as shown in FIG. 4. The link is mounted to the front wall of the housing 12 by a mounting bolt 91 which is attached to a slot 92 to permit longitudinal movement of the link 90 between the fully extended position shown in FIGS. 4 and 5 and the retracting position, not shown in the Figures. Preferably, the link is spring mounted by a compression spring 93 to ensure that inadvertent retraction of the pin does not occur. Thus, the retracting link 90 is always biased in the fully extended position shown in the Figures so that the latching bolt 81 is never retracted during non-actuated times.

The spring loaded link 90 is connected at the interior end to coupling 52 and, in one preferred embodiment, to emergency coupling 62. When the couplings 52 or 62 are actuated to be retracted away from the connection pin, the link 90 is pulled inward or towards the right in FIG. 5. This motion causes the link 90 to act upon the latching bolt 81 to retract it from the fully extended position and permit removal of latching plates therefrom. Specifically, link 90 is further provided with extension finger or fingers 95, each of which has a wedge shape so that the bottom portion thereof cams against the pin 85 located on latching bolt 81 to drive the bolt downward against the action of compression spring 82. When the actuation is effected by turning the control knob 14, and thereby crank arm 50, the mechanism can manually be operated to retract the latching pin 81 in the downward position thereby releasing latch plates, and then allowed to return by turning the control knob 14 back to the neutral position in which crank arm 50 is in the laterally extended position shown in FIGS. 4 and 5.

However, when the emergency mechanism is actuated, the emergency crank arm 60 is freed to be pulled by tension spring 65. The link 90 is, in turn, pulled by emergency coupling 62 toward the center of the device and is held there by force of spring 65 which is greater than the combined force of compression link springs 93 on both sides of the device so that the link 90 is jammed to the right as shown in FIG. 5 thereby permanently retracting latching bolt 81 in the downward position. In this way, latch plates can easily be removed or even ejected, if they are spring loaded, to effect release of the occupant of the seat.

To ensure a proper alignment within the housing 12, the release mechanisms can also be provided with a shim 100 mounted on the housing in order to guide the wedge-shaped fingers 95. As can be seen from the drawings, release is accomplished by wedging the latch bolts out of the latch plates, the force being easily provided by the occupant and/or the emergency release system.

In order to permit free travel of the link 90 to the disconnect position in the emergency operation, couplings 52 and 54 must also be equipped with a longitudinal free travel feature, which is shown in the drawings as elongated slots 53 and 55.

Consequently, the mechanism provided in the present invention provides a highly dependable single-point release device which is convenient and has a safe emergency release feature, and thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. Improved harness restraint system for a seat occupant in a vehicle comprising:
   one single-point release device having two releasable connectors laterally separated which can be actuated from a single position to release harness strap plates connected at said laterally-separated connectors, and two additional laterally-spaced connectors said single-point release device for laterally-connected lower body straps for attachment of lower body straps thereto, said single-point release device positioned at the center of occupant's body below the rib cage and adapted to receive all harness straps at said position,
   harness shoulder straps which cross diagonally over the chest of the occupant while in use and terminate in harness strap plates for attachment to said laterally-separated releasable connectors, each said shoulder strap comprising a gross adjustment device for adjustment of said harness to substantially approximate occupant size, harness leg straps each of which encircles a leg of the occupant and terminates in a harness strap plate for attachment to said two additional laterally-spaced releasable connectors, and water-actuated release mechanism for releasing said harness strap plates in a water environment.

2. The restraint system of claim 1 wherein said at least two connectors are each located on said single-point release device not less than about 2 inches from the center of said single-point release device.

3. The restraint system of claim 2 wherein said connectors are not less than about 3½ inches from the center of said single-point device.

4. The device of claim 1 wherein each said connection pin comprises a base means fixed on said rear wall, a latching bolt having a beveled end surface which is coaxially mounted for longitudinal movement on said base means and secured against circumferential rotation relation to said base with the lower edge of said beveled surface oriented toward said adjacent aperture whereby a restraint strap plate passed through said aperture will bear against said beveled surface and cam said latching bolt longitudinally toward said base, said latching bolt further comprising a retracting element fixed thereon which cooperates said actuation means to retract said latching bolt longitudinally toward said base, and biasing means which continuously urges said latching bolt toward said front wall whereby said latching bolt returns to said extended condition in the absence of camming or retraction forces.

5. The device of claim 4 wherein said retracting element is a surface for receipt of a retracting cam surface thereagainst which cams the latching bolt toward said base upon actuation of said release handle, and said biasing means is a compression spring surrounding said base means between the inside surface of said rear wall and said latching bolt whereby said bolt is continuously urged toward said front wall.

6. The device of claim 5 wherein said surface is provided by a pin extending substantially perpendicular to the longitudinal axis of said latching bolt.

7. A single-point release device useful for releasable connection of restraint strap plates of a harness restraint system which have latching holes therethrough comprising:

a housing having a front and a rear wall and a top and a bottom side, said top side provided with at least two apertures laterally spaced apart for receiving said harness strap plates, a release handle attached to said housing for actuation, connection pins mounted for movement between an extended position and a retracted position in said housing adjacent each said aperture and accessible therethrough, said pins continuously urged toward the extended position for engagement with said latch holes in said strap plates, and actuation means linking said connection pins to said release handle for retraction of said pins upon actuation of said handle whereby said harness restraint strap plates are disengaged for release.

8. The device of claim 7 wherein said housing is elongated having said release handle attached at the center, and wherein there are four said apertures and four said connection pins, two of said apertures located in said top side at a distance of not less than about 2 inches from the center of said device, the other two of said apertures being located in said bottom side opposite said top side apertures whereby the top and bottom connection pins are mounted in a side-by-side relationship.

9. The device of claim 8 wherein said apertures are each located about 3½ inches from the center of said device.

10. The device of claim 7 wherein said release handle is a knob secured for rotation to said housing and connected to said actuation means for retraction of said connection pins upon rotation clockwise or counterclockwise.

11. The device of claim 10 wherein said knob includes a releasable locking means for locking said knob against rotation which can be released to allow rotation in either said clockwise or counterclockwise direction.

12. The device of claim 11 wherein said releasable locking means is a depressible button attached to said knob for engagement with said housing in the non-depressed condition to prevent rotation of said knob, which disengages said housing to allow knob rotation in the depressed condition.

13. The device of claim 10 wherein said actuation means comprises:

a crank arm which is fixed to said knob for rotation simultaneously therewith in either direction, two actuator couplings each having a first and a second end and extending from said crank arm toward one of said connection pins, said first end attached to said crank arm for moving said coupling away from said connection pin upon rotation of said crank arm in either direction, said second end of said coupling equipped with means for retracting said connection pin which is supported on said housing for retraction of said connection pin upon rotation of said knob.

14. The device of claim 13 which further includes an emergency actuation means mounted in said housing comprising:

emergency actuation assembly including a source of emergency actuation force which links said connection pins to an emergency actuation force for retraction of said pins upon actuation of said force, and emergency sensing means securing said emergency actuation assembly against actuation in the absence of an emergency condition.

15. The device of claim 14 wherein said emergency sensing means is a ballistic charge unit having a means for electronically detecting a water environment and detonating a charge in response to said water environment, and said emergency actuation assembly is urged by said emergency actuation force in the direction corresponding to retraction of said connection pin and is detachably fixed to said ballistic charge unit for detachment upon detonation of said ballistic charge whereby said emergency actuation force is actuated in a water environment.

16. The device of claim 15 wherein emergency actuation force is a tension spring fixed between said emergency actuation assembly and said housing for actuating said assembly to retract said connection pins in the absence of being secured against acutation.

17. The device of claim 14 wherein said emergency actuation assembly comprises:

an emergency crank arm mounted to said knob coaxially with said crank arm for free rotation in at least one direction, and at least two emergency actuator couplings, each having a first and a second end and extending from said emergency crank arm to one of said connection pins, said first end of each emergency coupling coupled to said crank arm for moving said coupling away from its corresponding connection pin upon said unidirectional rotation of said crank arm, said second end of said coupling equipped with emergency means for retracting said connection pin upon said movement of said coupling away from said connection pin.

18. The device of claim 17 wherein said emergency means for retraction is said second end of said coupling and said coupling is provided with means for allowing movement of said second end in the absence of rotation of said knob.

19. The device of claim 18 wherein said means for allowing movement of said second end comprises a linear slot attaching said first end of said coupling to said crank arm whereby movement of said coupling away from its respective connection pin independent of rotation of said knob is accommodated.

20. The device of claim 13 wherein said means for retraction comprises a linkage having a first end connected to said coupling and a second end formed with a retracting cam surface which coacts with a receiving surface on said connection pin to retract said pin upon movement of said linkage away from said connector pin, said linkage bolted to said housing through a longitudinal slot for accommodating longitudinal movement between a connect position which corresponds to the nonactuated condition of said actuation means and a disconnect position which corresponds to the actuated condition of said actuation means.

21. The device of claim 20 wherein said retracting cam surface is formed by a wedge-shaped finger which is braced on one side by housing-mounted shim means, the widest portion of said wedge extending beyond said receiving surface of said connection pin in said connect position and being drawn toward said receiving surface as said linkage is drawn longitudinally away from said pin upon rotation of said knob whereby said retracting cam surface bears against said receiving surface to retract said pin.

22. The device of claim 20 wherein said first end of said linkage is offset from said second end.

23. The device of claim 21 wherein there are more than one finger whereby more than one connection pin are accommodated.

24. The device of claim 7 which further includes an emergency actuation means mounted in said housing comprising:

emergency actuation assembly including an emergency actuation force, said assembly linking said connection pins to said emergency actuation force for retraction of said pins upon actuation of said force, and emergency sensing means securing said emergency actuation assembly against actuation in the absence of an emergency condition.

25. The device of claim 24 wherein said emergency sensing means comprises:

a ballistic charge unit which includes means for electronically detecting a water environment and detonating a charge in response to said water environment, and fixation means secured to said ballistic charge unit and to said emergency actuation assembly which is detached from said ballistic charge unit upon detonation of said charge whereby said emergency actuation assembly is actuated by said emergency actuation force.

26. The device of claim 25 wherein said emergency actuation force is a biasing means urging said assembly in the direction for retraction of said connection pins, and said fixation means is a hollow pin friction fitted over said ballistic charge for detachment upon detonation of said ballistic charge whereby said emergency actuation force is actuated in a water environment.

27. The device of claim 26 wherein there are two ballistic charge units with hollow pins which are connected by a tie rod, said tie rod, in turn, being attached to said assembly, whereby two emergency sensing means must be detonated to actuate said emergency actuation assembly.

28. The device of claim 26 wherein said emergency actuation force is a tension spring fixed between said assembly and said housing for actuating said assembly to retract said connection pins in the absence of being secured against actuation.

29. The device of claim 24 wherein said emergency actuation assembly comprises:

an emergency crank arm fixed for rotation in at least one direction, at least two emergency actuator couplings, each having a first and a second end and extending from said emergency crank arm to one of said connection pins, said first end of each emergency coupling coupled to said crank arm for moving said coupling away from one of said connection pins upon said unidirectional rotation of said crank arm, said second end of said coupling equipped with emergency means for retracting said connection pin upon said movement of said coupling away from said connection pin.

30. The device of claim 28 wherein said emergency means for retraction comprises an emergency linkage having a first end connected to said coupling and a second end formed with an emergency retracting cam surface which coacts with an emergency receiving surface on said connection pin to retract said pin upon movement of said emergency linkage away from said connection pin, said emergency linkage bolted to said housing through a longitudinal slot for accommodating longitudinal movement between a connect position which corresponds to the non-actuated condition of said emergency release assembly and a disconnect position which corresponds to the actuated condition of said emergency release assembly.

31. The device of claim 30 wherein said emergency retracting cam surface is formed by a wedge-shaped finger which is braced on one side by housing-mounted shim means, the widest portion of said wedge extending beyond said emergency receiving surface of said connection pin in said connect position and drawn toward said emergency receiving surface as said emergency linkage is moved toward said disconnect position whereby said emergency retracting cam surface bears against said emergency receiving surface to retract said connection pin.

32. The device of claim 31 wherein said second end of said emergency linkage is offset from said first end.

33. The device of claim 32 wherein there are more than one finger formed in said second end whereby more than one connection pin are accommodated.

34. Gross adjustment harness strap device adaptable for harness assemblies requiring strap adjustment which provides gross adjustment of said straps to substantially approximate occupant size comprising:
harness belt adjustment means having an indicator viewing window which is adapted for fixed attachment to a harness assembly, and
indicator harness strap marked with indicators corresponding to adjustment lengths which accommodate different body sizes for the particular harness assembly, which fits cooperatively with said adjustment means so that said indicators appear in said viewing window when the length of said strap is an appropriate length to accommodate the indicated body size.

35. The device of claim 34 wherein said harness belt adjustment means comprises a sliding hasp having a fixed end for securing to a fixed length of strap of a harness assembly, and an adjustment end which includes said viewing window and is adapted for sliding receipt of said indicator harness strap.

36. The device of claim 34 which further comprises a harness restraint adjustor threaded on said indicator harness strap for minor harness adjustments.

37. Improved harness restraint system for a seat occupant in a vehicle comprising:
single-point release device having at least two releasable connectors laterally separated which can be actuated form a single position to release harness strap plates connected at said laterally-separated connectors,
harness shoulder straps which cross diagonally over the chest of the occupant while in use and terminate in harness strap plates for attachment to said laterally-separated releasable connectors, and
gross adjustment device threaded on each said harness shoulder strap and adapted for adjustment of said harness to substantially approximate occupant size, each said gross adjustment device including harness belt adjustment means having an indicator viewing window which is adapted for fixed attachment to a harness assembly, and
indicator harness strap marked with indicators corresponding to adjustment lengths which accommodate different body sizes for the particular harness assembly, and which fits cooperately with said adjustment means so that said indicators appear in said viewing window when the length of said strap is the proper length to accommodate the indicated body size.

38. The device of claim 37 wherein said harness belt adjustment means comprises a sliding hasp having a fixed end for securing to a fixed length of strap of a harness assembly, and an adjutment end which includes said viewing window and is adapted for sliding receipt of said indicator harness strap.

39. The restraint system of claim 37 wherein each said harness straps further comprises harness restraint adjustor threaded on said indicator harness strap for minor harness adjustments.

40. Improved harness restraint system for a seat occupant in a vehicle comprising:
single-point release device having at least two releasable connectors laterally separated which can be actuated from a single position to release harness strap plates connected at said laterally-separated connectors, and
harness shoulder straps which cross diagonally over the chest of the occupant while in use and terminate in harness strap plate for attachment to said laterally-separated releasable connectors, each said shoulder strap comprising a gross adjustment device for adjustment of said harness to substantially approximate occupant size, said gross adjustment device comprising
harness belt adjustment means having an indicator viewing window adapted for fixed attachment to a harness assembly, and
indicator harness strap marked with indicators corresponding to adjustment lengths which accommodate different body sizes for the particular harness assembly, and fits cooperatively with said adjustment means so that said indicators appear in said viewing window when the length of said strap is the proper length to accommodate the indicated body size.

41. The harness restraint system of claim 40 wherein said harness belt adjustment means comprises a sliding hasp having a fixed end for securing to a fixed length of strap of a harness assembly, and an adjustment end which includes said viewing window and is adapted for sliding receipt of said indicator harness strap.

42. The harness restraint system of claim 40, wherein each said harness strap further comprises harness restraint adjustor threaded on said indicator harness strap for minor harness adjustments.

* * * * *

UNITED STATES PATENT AND TRADEMARK OFFICE
CERTIFICATE OF CORRECTION

PATENT NO. : 4,738,413

DATED : April 19, 1988

INVENTOR(S) : Dominic J. Spinosa et al.

It is certified that error appears in the above-identified patent and that said Letters Patent is hereby corrected as shown below:

Column 10, line 60, before the word "said" insert --on--.

Column 16, line 7, delete "adjutment" and insert therefor --adjustment--.

Signed and Sealed this

Tenth Day of January, 1989

Attest:

DONALD J. QUIGG

Attesting Officer

Commissioner of Patents and Trademarks